(12) United States Patent
Stoicescu et al.

(10) Patent No.: US 11,698,701 B1
(45) Date of Patent: Jul. 11, 2023

(54) FORCE SENSING IN TOUCH SENSOR BY DIRECTIVITY CONTROL OF TRANSMIT TRANSDUCERS

(71) Applicant: Infineon Technologies AG, Neubiberg (DE)

(72) Inventors: Emanuel Stoicescu, Bucharest (RO); Erhard Landgraf, Dresden (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/702,182

(22) Filed: Mar. 23, 2022

(51) Int. Cl.
*G06F 3/041* (2006.01)
*G06F 3/043* (2006.01)

(52) U.S. Cl.
CPC .......... *G06F 3/0436* (2013.01); *G06F 3/0416* (2013.01)

(58) Field of Classification Search
CPC .............................. G06F 3/0416; G06F 3/0436
See application file for complete search history.

(56) References Cited

U.S. PATENT DOCUMENTS

| 2016/0077620 | A1* | 3/2016 | Choi | ....................... G06F 3/041 345/173 |
| 2021/0278927 | A1* | 9/2021 | Jennings | ................. G10K 9/125 |
| 2021/0397802 | A1* | 12/2021 | Arellano | .................. G06F 3/167 |
| 2021/0405809 | A1* | 12/2021 | Khajeh | ............... G06F 3/04182 |

FOREIGN PATENT DOCUMENTS

| GB | 2541467 A | 2/2017 |
| WO | 2013075137 A1 | 5/2013 |

* cited by examiner

*Primary Examiner* — Ryan A Lubit
(74) *Attorney, Agent, or Firm* — Harrity & Harrity, LLP (57) ABSTRACT

A touch sensor includes a touch structure arranged over an ultrasound port; an array of transceiver transducers arranged inside the ultrasound port and configured to generate a main directivity lobe directed at a touch interface, receive an ultra-sonic reflected wave produced at least in part by internal reflection of the main directivity lobe at the touch interface, and convert the ultra-sonic reflected wave into at least one measurement signal; a controller configured to modulate a directivity characteristic of the main directivity lobe by selectively activating the transmit transducers; and a receiver circuit configured to determine a size of a contact patch of a touch event present at the touch interface based on the at least one measurement signal and the directivity characteristic of the main directivity lobe, and determine an amount of contact force applied during the touch event based on the size of the contact patch.

30 Claims, 5 Drawing Sheets

FORCE SENSING IN TOUCH SENSOR BY DIRECTIVITY CONTROL OF TRANSMIT TRANSDUCERS

BACKGROUND

Touch sensing through metal surfaces using ultra-sonic waves is currently being investigated as an alternative to capacitive touch sensing principles. Ultra-sonic sensing relies on the transmission of an ultra-sonic signal and the reception and processing of the reflected waveform from the touch surface of a touch substrate. The waveform will depend on the existence or non-existence of a touch event. However, replacing mechanical buttons with a touch user-interface will require force detection in addition to touch/no-touch detection. Accordingly, an ultra-sonic touch sensor that can discriminate the touch pressing force may be desirable.

SUMMARY

In some aspects, the techniques described herein relate to a touch sensor, including: a housing having an ultrasound port; a touch structure coupled to the housing and arranged over the ultrasound port such that the ultrasound port forms an enclosed interior volume, wherein the touch structure includes a touch interface and an inner interface arranged opposite to the touch interface, wherein the inner interface faces towards the enclosed interior volume; an array of transmit transducers arranged inside the enclosed interior volume, wherein each transmit transducer is configured to transmit a respective ultra-sonic transmit wave in response to being activated by a respective excitation signal, wherein a main directivity lobe directed at the touch interface is produced by at least one ultra-sonic transmit wave; an array of receive transducers arranged inside the enclosed interior volume and acoustically coupled to the array of transmit transducers, wherein the array of receive transducers receive an ultra-sonic reflected wave produced at least in part by internal reflection of the main directivity lobe at the touch interface and convert the ultra-sonic reflected wave into at least one measurement signal; a controller configured to modulate an activation of the transmit transducers to control a directivity characteristic of the main directivity lobe by selectively generating at least one respective excitation signal; and a receiver circuit configured to receive the at least one measurement signal, detect edges of a contact patch of a touch event present at the touch interface based on the at least one measurement signal, determine a size of the contact patch based on the detected edges, and determine an amount of contact force applied during the touch event based on the size of the contact patch.

In some aspects, the techniques described herein relate to a touch sensor, including: a housing having an ultrasound port; a touch structure coupled to the housing and arranged over the ultrasound port such that the ultrasound port forms an enclosed interior volume, wherein the touch structure includes a touch interface and an inner interface arranged opposite to the touch interface, wherein the inner interface faces towards the enclosed interior volume; an array of transceiver transducers arranged inside the enclosed interior volume, wherein each transceiver transducer is configured transmit a respective ultra-sonic transmit wave in response to being activated by a respective excitation signal, wherein a main directivity lobe directed at the touch interface is produced by at least one ultra-sonic transmit wave, wherein the array of transceiver transducers is configured to receive an ultra-sonic reflected wave produced at least in part by internal reflection of the main directivity lobe at the touch interface and convert the ultra-sonic reflected wave into at least one measurement signal; a controller configured to modulate an activation of the transceiver transducers to control a directivity characteristic of the main directivity lobe by selectively generating at least one respective exci-tation signal; and a receiver circuit configured to receive the at least one measurement signal, detect edges of a contact patch of a touch event present at the touch interface based on the at least one measurement signal, determine a size of the contact patch based on the detected edges, and determine an amount of contact force applied during the touch event based on the size of the contact patch.

In some aspects, the techniques described herein relate to a touch sensor, including: a housing having an ultrasound port; a touch structure coupled to the housing and arranged over the ultrasound port such that the ultrasound port forms an enclosed interior volume, wherein the touch structure includes a touch interface and an inner interface arranged opposite to the touch interface, wherein the inner interface faces towards the enclosed interior volume; an array of transmit transducers arranged inside the enclosed interior volume, wherein each transmit transducer is configured to transmit a respective ultra-sonic transmit wave in response to being activated by a respective excitation signal, wherein a main directivity lobe directed at the touch interface is produced by at least one ultra-sonic transmit wave; an array of receive transducers arranged inside the enclosed interior volume and acoustically coupled to the array of transmit transducers, wherein the array of receive transducers receive an ultra-sonic reflected wave produced at least in part by internal reflection of the main directivity lobe at the touch interface and convert the ultra-sonic reflected wave into at least one measurement signal; a controller configured to modulate an activation of the transmit transducers to control a directivity characteristic of the main directivity lobe by selectively generating at least one respective excitation signal; and a receiver circuit configured to receive the at least one measurement signal, determine a size of a contact patch of a touch event present at the touch interface based on the at least one measurement signal and the directivity characteristic of the main directivity lobe, and determine an amount of contact force applied during the touch event based on the size of the contact patch.

In some aspects, the techniques described herein relate to a touch sensor, including: a housing having an ultrasound port; a touch structure coupled to the housing and arranged over the ultrasound port such that the ultrasound port forms an enclosed interior volume, wherein the touch structure includes a touch interface and an inner interface arranged opposite to the touch interface, wherein the inner interface faces towards the enclosed interior volume; an array of transceiver transducers arranged inside the enclosed interior volume, wherein each transceiver transducer is configured transmit a respective ultra-sonic transmit wave in response to being activated by a respective excitation signal, wherein a main directivity lobe directed at the touch interface is produced by at least one ultra-sonic transmit wave, wherein the array of transceiver transducers is configured to receive an ultra-sonic reflected wave produced at least in part by internal reflection of the main directivity lobe at the touch interface and convert the ultra-sonic reflected wave into at least one measurement signal; a controller configured to modulate an activation of the transceiver transducers to control a directivity characteristic of the main directivity lobe by selectively generating at least one respective excitation signal; and a receiver circuit configured to receive the at least one measurement signal, determine a size of a contact patch of a touch event present at the touch interface based on the at least one measurement signal and the directivity characteristic of the main directivity lobe, and determine an amount of contact force applied during the touch event based on the size of the contact patch.

BRIEF DESCRIPTION OF THE DRAWINGS

Embodiments are described herein making reference to the appended drawings.

DETAILED DESCRIPTION

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration. It is to be understood that other embodiments may be utilized and structural or logical changes may be made without departing from the scope defined by the claims. The following detailed description, therefore, is not to be taken in a limiting sense. Directional terminology used in the claims may aid in defining one element's spatial or positional relation to another element or feature, without being limited to a specific orientation. For example, lateral, vertical, and overlapping spatial or positional relationships may be described in reference to another element or feature, without being limited to a specific orientation of the device as a whole.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The terms "substantially" and "approximately" may be used herein to account for small manufacturing tolerances (e.g., within 5%) that are deemed acceptable in the industry without departing from the aspects of the embodiments described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

One or more elements of the present disclosure may be configured by implementing dedicated hardware or a software program on a memory controlling a processor to perform the functions of any of the components or combinations thereof. Any of these components may be implemented as a central processing unit (CPU) or other processor reading and executing a software program from a recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPGAs), programmable logic controller (PLC), or other equivalent integrated or discrete logic circuitry.

Accordingly, the term "processor," as used herein refers to any of the foregoing structures or any other structure suitable for implementation of the techniques described herein. A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (i.e., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Embodiments relate to ultra-sonic (i.e., acoustic) touch sensors and ultra-sonic touch sensor systems. A sensor may refer to a component which converts a physical quantity to be measured to an electrical signal, for example a current signal or a voltage signal. In this case, the physical quantity is ultra-sonic sound waves produced, for example, by a microelectromechanical system (MEMS) transducer. Capacitive micromachined ultrasonic transducers (CMUTs) and piezoelectric micromachined ultrasonic transducers (PMUT) are two examples of MEMS transducers but the disclosed embodiments are not limited thereto. An excitation signal is a signal applied to the transmitter (TX) transducer to produce an ultrasonic wave that is used to detect touch events at a touch surface of the sensor package as well as the applied force thereof.

Figure 1:
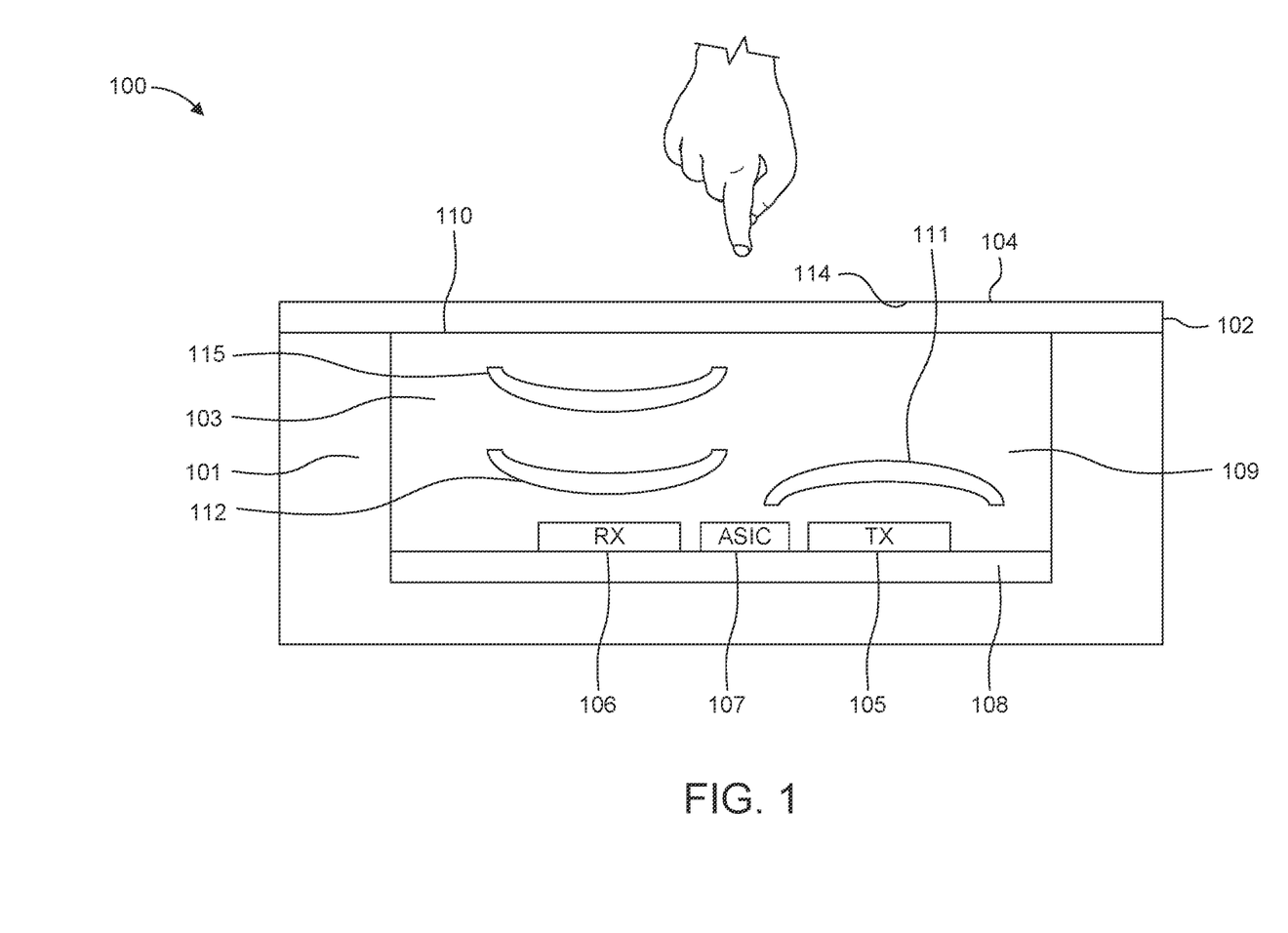
FIG. 1 illustrates an ultra-sonic touch sensor according to one or more embodiments.

FIG. 1A illustrates an ultra-sonic touch sensor 100 according to one or more embodiments. As defined herein, an ultra-sonic signal is a sound wave having a frequency of 20 kHz or higher. Indeed, in FIG. 1A ultra-sonic signals 111, 112, and 115 are depicted as ultra-sonic sound waves. A single transmitted wave/signal 111 causes two reflections at different interfaces 110 and 114, with ultra-sonic sound wave 112 being a reflection from interface 110 and ultra-sonic sound wave 115 being a reflection from interface 114. Being that the interface 114 is more distant from the transmitter than interface 110, the ultra-sonic sound wave 115 occurs at a later time instance than the occurrence of ultra-sonic sound wave 112. An acoustic impedance change at the second interface 114 from a touch event at the touch surface 104 causes a change in the reflected ultra-sonic sound wave 115. In particular, a change in signal amplitude of the reflected ultra-sonic sound wave 115 changes when the touch surface 104 is touched. The change in the reflected ultra-sonic sound wave 115 can be detected at the receiver side of the ultra-sonic touch sensor 100 for detecting touch/no-touch events as well as determining touch location and touch force.

The ultra-sonic touch sensor 100 includes a housing comprising an encapsulant 101 (e.g., molding) and a touch structure 102 (e.g., a touch substrate) that forms an interior volume 103 with the encapsulant 101 (e.g., overmolded thermoplastic). In other words, as part of the housing, the encapsulant 101 has a recess that becomes the interior volume 103 when the touch structure 102 encloses the recess. In some embodiments, the encapsulant 101 may extend into and fill the interior volume 103, thereby covering the sensor components arranged therein. Epoxy or some other ultrasound-compatible material casted in the recess may be used. Accordingly, the area of the housing in which the transducers reside may be referred to as an acoustic port or ultrasound port.

In either case, the touch structure 102 is used as a lid or a package cover that rests upon touch side of the housing. In the example shown, the interior volume 103 is a cavity that is formed by the enclosure of the encapsulant 101 and the touch structure 102. The touch structure 102 may be made of one or more metal layers and/or plastic layers and/or layers made out of other solid material and includes a touch surface 104 at its external interface with the environment. The touch surface 104 is arranged and operable to receive contact (i.e., touches) from a user that can be detected by sensor circuitry.

The interior volume 103 contains the circuitry used for detecting no-touch and touch events at the touch surface 104. A touch event is defined as an instance when a user makes contact with the touch surface 104 and a no-touch event is all other circumstances, including the occurrence of disturbing influences (i.e., error sources) that may occur in the absence of a touch event. The circuitry is configured to distinguish between a touch event and a no-touch event, taking into account possible errors originating from the disturbing influences.

The circuitry includes a transmitter (TX) 105 configured to transmit ultra-sound signals, a receiver (RX) 106 configured to receive reflected ultra-sound signals, and a sensor circuit 107 (e.g., an application specific integrated circuit (ASIC)) configured to generate the ultra-sound signals for transmission by the transmitter 105, perform signal processing on reflected ultra-sound signals received by the receiver 106, evaluate the reflected ultra-sound signals for detecting no-touch events and touch events by applying a touch detection algorithm, and control one or more components of the sensor 100, including control of the transmitter 105, the receiver 106, or any of the signal processing components of the signal processing chain of the sensor circuit 107.

The transmitter 105 and the receiver 106 may both be sound transducers with a flexible membrane that vibrates to either produce sound waves, in the case of a transmitter, or in response to receiving sound waves, in the case of a receiver. In particular, the transmitter 105 and the receiver 106 may be capacitive micromachined ultrasonic transducer (CMUTs). A CMUT is a transducer where the energy transduction is due to change in capacitance. CMUTs are constructed on silicon using micromachining techniques. A cavity may be formed in a silicon substrate, and a thin layer suspended on the top of the cavity serves as a membrane on which a conductive layer acts an electrode, together with the silicon substrate which serves as a bottom electrode. CMUTs with electrodes formed by back end of line (BEOL) metals—one being exposed to a pressure port—and a gap in the insulation structure between would make an ultrasound transducer as well.

If an AC signal is applied across the biased electrodes, the vibrating membrane will produce ultrasonic waves in the medium of interest. In this way, the CMUT works as a transmitter. The sensor circuit 107 is configured to generate an excitation signal and transmit the excitation signal to the transmitter 105. The excitation signal is applied across the biased electrodes, causing the membrane to vibrate according to the waveform of the excitation signal and producing a corresponding ultrasonic wave. Different excitation signals induce different ultrasonic waves. On the other hand, if ultrasonic waves are applied to the membrane of a biased CMUT, the membrane will vibrate according to the applied ultrasonic wave and the CMUT will generate alternating signal (i.e., a measurement signal) as its capacitance is varied. In this way, the alternating signal is a measurement signal representative of received ultrasonic waves and the CMUT operates as a receiver of ultrasonic waves. It is also possible that each MEMS transducer is configurable as a transceiver that is capable of both transmitting and receiving ultrasonic waves.

The transmitter 105, the receiver 106, and the sensor circuit 107 may be arranged on common circuit substrate 108 (e.g., a PCB) that is disposed at the base of the encapsulant. The common circuit substrate 108 is configured to electrically couple the sensor circuit 107 to both the transmitter 105 and the receiver 106. The transmitter 105, the receiver 106, and the sensor circuit 107 may be separate ICs (i.e., dies) or may be combined in any combination into one or two Ics. Additionally, both the transmitter 105 and the receiver 106 may be implemented as separate transceivers such that two transmitters and two receivers are provided.

As will be described in reference to FIG. 2, one or more arrays of transducers may be provided. The transmitter 105 may be one of a plurality of transmitters provided in an array of transmit transducers that is arranged inside the ultrasound port. Likewise, the receiver 106 may be one of a plurality of receivers provided in an array of receivers that is arranged inside the ultrasound port. Alternatively, an array of transceiver transducers may be provided inside the ultrasound port.

The remaining portion of the interior volume 103 may be filled with a coupling medium 109, such as a silicone gel, soft epoxy, liquid, or any other material that enables the propagation of ultra-sonic signals with substantially no attenuation. The coupling medium 109 is a non-gaseous medium.

The coupling medium 109 is in contact with an inner (interior) surface 110 of the touch structure 102, the interface of which is configured to reflect transmitted ultra-sonic signals 111 back into the interior volume 103 to be received by the receiver 106 as reflected ultra-sonic signals 112. Thus, the transmitter 105 and the receiver 106 are coupled together by the coupling medium 109. The coupling medium 109 and the inner surface 110 form a propagation channel between the transmitter 105 and the receiver 106. As noted above, the touch surface 104 forms an interface 114 with the environment, where the interface 114 is part of the propagation channel. A second internal reflection of the transmitted ultra-sonic signal occurs at this interface 114, producing reflected ultra-sonic signal 115.

A touch event at the touch surface 104 of the touch structure 102 causes a change in a property of the propagation channel (e.g., a property at interface 114) and thereby changes the propagation of the ultra-sonic signals through the propagation channel from the transmitter 105 to the receiver 106. In other words, a property of an ultra-sonic signal propagating along the propagation channel changes in response to a touch event at the touch surface 104 and the sensor circuit 107 is configured to detect the touch event, including one or more characteristics thereof, including amount of contact pressure, a contact duration, and a contact location on the touch surface 104. In particular, during operation of the touch sensor 100, the sensor circuit 107 is configured to apply a touch detection algorithm to distinguish between a touch event and a no-touch event, taking into account possible error sources such as electrical and ultra-sonic cross-talk, multipath propagation, noise, temperature, and environmental disturbances such as dirt or water on the touch surface 104.

During operation of the touch sensor 100, the sensor circuit 107 is configured to generate an ultra-sonic transmit signal for each touch/no-touch decision by applying an excitation signal. Upon receipt of each reflected ultra-sonic signal, the sensor circuit 107 makes a touch/no-touch decision using the touch detection algorithm. The time between sub-sequent touch detections (i.e., between successive excitation signals) can be in the order of 25 us, for example. The period between triggering an excitation signal and a next excitation signal may be referred to as an excitation frame. The sensor circuit 107 is configured to analyze reflected signals for each excitation frame to make a touch/no touch decision on a frame-by-frame basis.

An excitation signal may be a short signal pulse or a pulse train comprised of multiple short pulses (e.g., having a duration of about 100 ns up to about 1 us). An excitation signal can have any shape (e.g., rectangular, sinusoid, Gaussian, a Gaussian derivative, etc.) or may be a chirp signal whose frequency continuously increases or decreases from a start frequency to a stop frequency, for example, by using linear frequency modulation. Thus, an excitation signal may have either a fixed (constant) frequency or a changing (modulated) frequency. In a pulse train, the pulses may have a same frequency or may have different frequencies and/or the same pulse duration (i.e., bandwidth) or different pulse durations (i.e., bandwidths). A signal amplitude of the excitation signals is also configurable and may vary between excitation signals. Pulses of a pulse train may have a constant (fixed) amplitude or varied amplitudes. A number of pulses used in a pulse train also configurable among excitation signals. A pulse frequency (i.e., a period between successive pulses of a pulse train) may also be configurable and may be different among excitation signals that have a pulse train. A pulse train comprising signal chirps may have fixed (constant) start and stop frequencies among signal chirps or may have variable start and/or stop frequencies among signal chirps. The signal chips may have the same pulse duration or have different pulse durations.

On the receiver side, the sensor circuit 107 includes an analog signal processing chain and a digital signal processing chain, both of which may include one or more optional components. The analog signal processing chain may include a direct down-converter and low-pass filter as optional components. The direct down-converter may include any form of direct down-conversion of the reflected ultra-sonic signals 112 and 115. For example, squaring, absolute value, rectification, and so on may be used for performing the direct down-conversion. Analog circuit blocks for such a down-conversion processing can be a multiplier or even just a diode. The low-pass filter cut-off frequency should be tuned to the bandwidth of the transmitted ultra-sonic signal and the bandwidth of the transmitter 105. For example, the low-pass filter cut-off frequency could be set 1 MHz or 2 MHz.

The sensor circuit 107 includes an analog-to-digital converter (ADC) that is configured to capture multiple digital samples (i.e., measurement samples) from the reflected ultra-sonic signals 112 and 115 for each ultra-sonic transmit signal and store the digital samples in memory. A digital processor is operable to evaluate the digital samples received in an observation window using the selected touch detection algorithm to determine whether there is a no-touch event or touch event corresponding to the ultra-sonic transmit signal.

Figure 2:
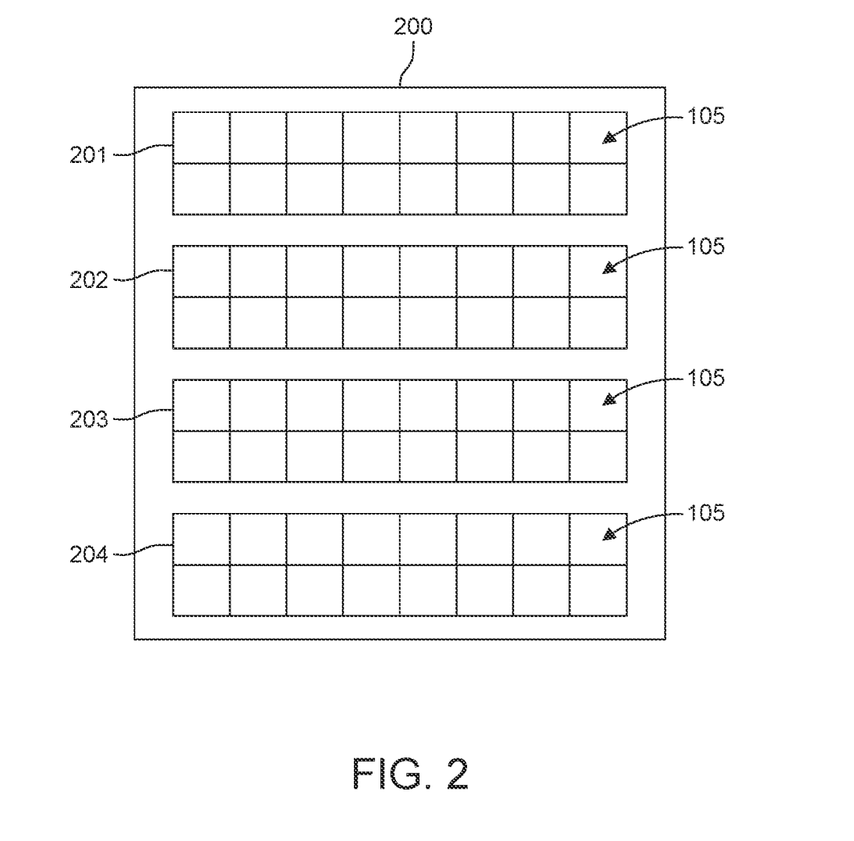
FIG. 2 is a top-view of array of transceiver transducers 200 according to one or more embodiments.

FIG. 2 is a top-view of array of transceiver transducers 200 according to one or more embodiments. The array of transceiver transducers 200 extends in two dimensions within the ultrasound port to cover a substantial area under the touch structure 102. The array of transceiver transducers 200 may include two or more sub-arrays 201-204 that each include a subset of transceiver transducers. Individual transceiver transducers of the array 200 are configurable as transmitters, receivers, or transceivers. This configurability may be set on an individual basis (transducer-by-transducer), on a sub-array basis, or some other basis. Moreover, while each transducer is shown to be substantially equal in size, the transducers may vary in size. For example, the transducers of sub-array 201 may be larger than the transducers of sub-array 202. The size of an acoustic wave produced by a single transducer is proportional to the size (i.e., to the membrane area) of that transducer.

Each transducer of the array 200 is separately controllable by the sensor circuity 107. They may be individually excited, alone or in combination, as transmitters and may be individually configured, alone or in combination, for receiving. When one or more transmit transducers are excited, each transducer produces its own ultra-sonic transmit wave with acoustic aperture or beam width (i.e., proportional to the size of the membrane). If two or more transmit transducers are activated simultaneously, their respective ultra-sonic transmit wave combine either constructively or deconstructively via constructive or deconstructive interference to produce a combined (superimposed or compounded) ultra-sonic transmit wave that has a main directivity lobe and possibly additional side lobes. The individual wavefronts may be spherical, but they may combine in front of the array 200 to create a plane wave, which is a beam of ultrasonic waves travelling in a specific direction. The transmission direction or orientation angle of the main directivity lobe is said to correspond to the traveling direction of the plane wave. When only a single transmit transducer is activated, the main directivity lobe corresponds to the individual wavefront produced by that transmit transducer.

Whether one transmit transducer is excited or multiple transmit transducers are excited, the main directivity lobe has one or more directivity characteristics that can be adjusted by a controller. Directivity characteristics of the main directivity lobe includes transmission direction, orientation angle, acoustic aperture size, beam width, beam height, etc. As a result, beam sizing, beam forming, and beam steering can be realized by modulating the activation of the transmit transducers to control the directivity characteristic of the main directivity lobe by selectively generating at least one respective excitation signal. Changing the directivity characteristic of the main directivity lobe changes the area of incidence of the main directivity lobe on interface 114.

A contact patch refers to the area of the touch surface 104 at which a touch event occurs. The size of the contact patch is an area of impedance change at the touch interface 114 resultant from the touch event. The size of the contact patch is proportional to the amount of contact force applied during a touch event. For example, less forceful touches have smaller contact patches, whereas more forceful touches have larger contact patches. Changing the directivity characteristic of the main directivity lobe can be used to detect the edges of a contact patch to determine its size.

In particular, the receiver circuit of the sensor circuit 107 is configured to receive at least one measurement signal generated by one or more receive transducers and determine whether a no-touch event or the touch event has occurred at the touch interface 104 based on at least one measurement signal received from the array 200. The receiver circuit may perform a signal amplitude threshold analysis by comparing the amplitude(s) of received measurement signal(s) to a threshold and determining whether a touch event or a no touch event has occurred based on the comparison. Additionally, the receiver circuit of the sensor circuit 107 is configured to detect edges of a contact patch of a touch event present at the touch interface 114 based on the at least one measurement signal, determine a size of the contact patch based on the detected edges, and determine an amount of contact force applied during the touch event based on the size of the contact patch by using a correlation algorithm. Alternatively, the receiver circuit may determine a size of a contact patch of a touch event present at the touch interface 114 based on the at least one measurement signal and the directivity characteristic of the main directivity lobe, and determine an amount of contact force applied during the touch event based on the size of the contact patch by using a correlation algorithm.

The sensor circuit 107 further includes a controller (e.g., a microcontroller) configured to modulate an activation of the transmit transducers to control a directivity characteristic of a main directivity lobe of an acoustic wave by selectively generating one or more excitation signals for selectively exciting one or more transmit transducers. Because each transmit transducer is excited by a respective excitation signal to produce a respective ultra-sonic wave, this configurability enables the controller to control how the main directivity lobe is formed and how it is directed at the interface 114 by controlling which transmit transducers are excited and how they are excited.

Figure 3A:
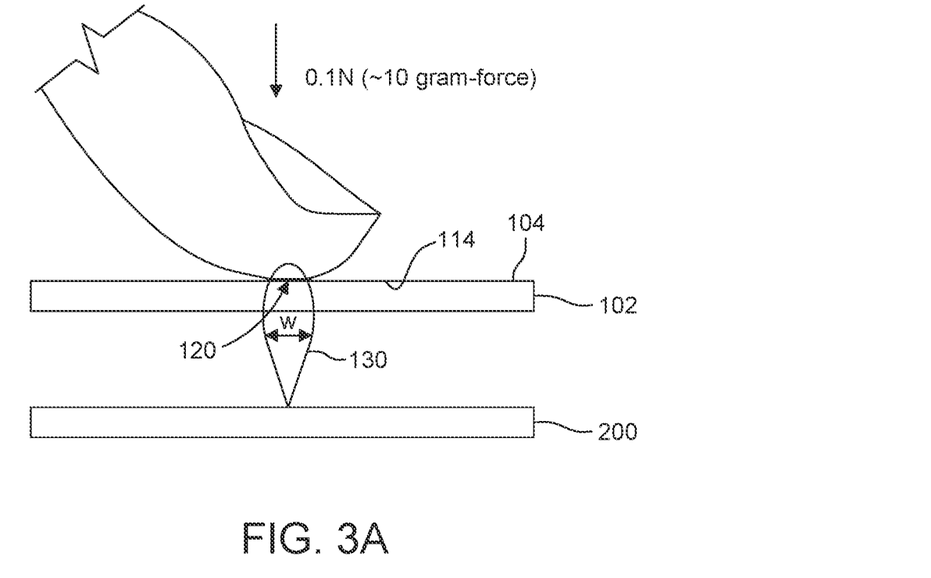
FIGS. 3A and 3B illustrate sizing of an acoustic aperture during a touch event according to the one or more embodiments.

FIGS. 3A and 3B illustrate sizing of an acoustic aperture during a touch event according to the one or more embodiments. In FIG. 3A, a small contact force is applied to the touch surface 104 resulting in a small contact patch 120 at the touch surface. In this example, 0.1 newtons (N) is applied. The total size or area of the contact patch 120 is relatively small. Additionally, the array of transceiver transducers 200 produces a main directivity lobe 130 directed at the touch interface 114 with at least one ultra-sonic transmit wave. Here, the main directivity lobe 130 has a narrow beam width W or beam spread.

Figure 3B:
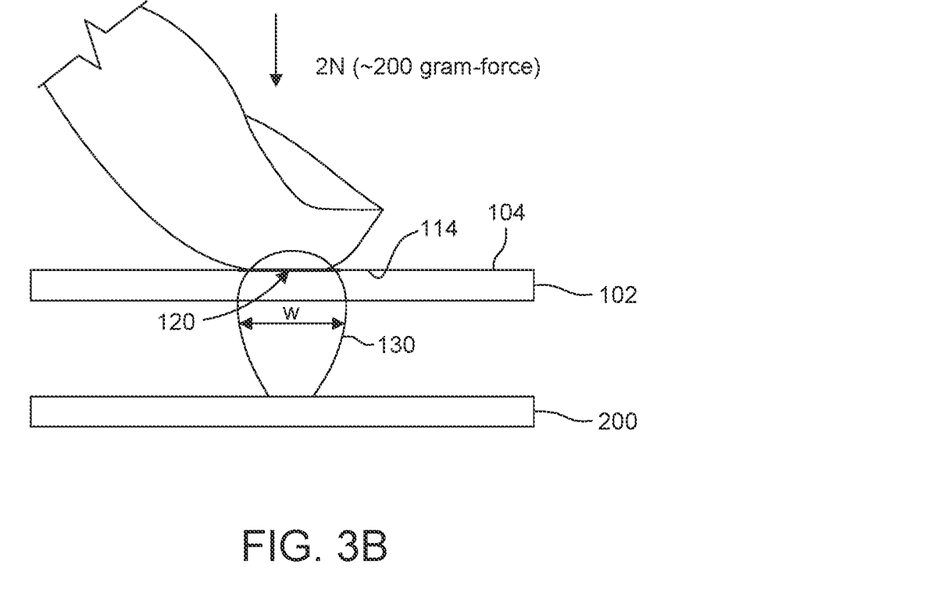

In FIG. 3B, a larger contact force is applied to the touch surface 104 resulting in a small contact patch 120 at the touch surface. In this example, 2 newtons (N) is applied. The total size or area of the contact patch 120 is relatively large compared to the contact patch shown in FIG. 3A. Additionally, the array of transceiver transducers 200 produces a main directivity lobe 130 directed at the touch interface 114 with at least one ultra-sonic transmit wave. Here, the main directivity lobe 130 has a larger beam width W or beam spread.

FIGS. 3A and 3B illustrate an example of controlling the acoustic aperture of the main directivity lobe 130. The transmission direction remains vertical but the location of emission of the main directivity lobe within the array 200 may be changed. Additionally, the beam width of the main directivity lobe 130 may be changed dynamically or semi-statically. Thus, the coverage area or area of incidence of the main directivity lobe 130 at the touch interface 114 can be changed by modulating the beam width of the main directivity lobe 130.

The beam width W of the main directivity lobe 130 can be controlled by electrical activation of a larger or smaller area of transmit transducers 105 within the array 200. For example, a number of transmit transducers 105 can be increased to enlarge the total activated area of the array 200 or the number of transmit transducers 105 can be decreased to decrease the total activated area of the array 200. Alternatively, the beam width W of the main directivity lobe 130 can be controlled by switching between different sizes of transmit transducers 105 so that larger transmit transducers 105 are activated to increase the beam width W and smaller transmit transducers 105 are activated to decrease the beam width W. Of course, different combinations of larger and smaller transmit transducers may be activated to tune the beam width in different increments.

The beam width W may also be modulated by using the principle of constructive and deconstructive interference to form a compounded wave or beam. The controller may be configured to switch the beam width of the main directivity lobe between at least two different beam widths by selectively changing an active element pitch between activated transmit transducers. An active element pitch refers to a distance between two excited transmit transducers 105. There may be one or more inactive transmit transducers 105 between active ones. An inactive transmit transducer is one that does not receive an excitation signal.

When two excited transmit transducers 105 are closer together, constructive interference is the dominate interference between ultrasonic waves produced by the two excited transmit transducers 105. Thus, the ultrasonic waves are constructively added that results in a wider main directivity lobe. In contrast, when two excited transmit transducers 105 are further apart, deconstructive interference is the dominate interference between ultrasonic waves produced by the two excited transmit transducers 105. Thus, the ultrasonic waves are deconstructively added that results in a narrower main directivity lobe. As a result, the beam width W of the main directivity lobe is inversely related to the active element pitch between the activated transmit transducers due to at least one of constructive interference and deconstruction interference of at least two ultra-sonic transmit waves that produce the main directivity lobe.

Figure 3C:
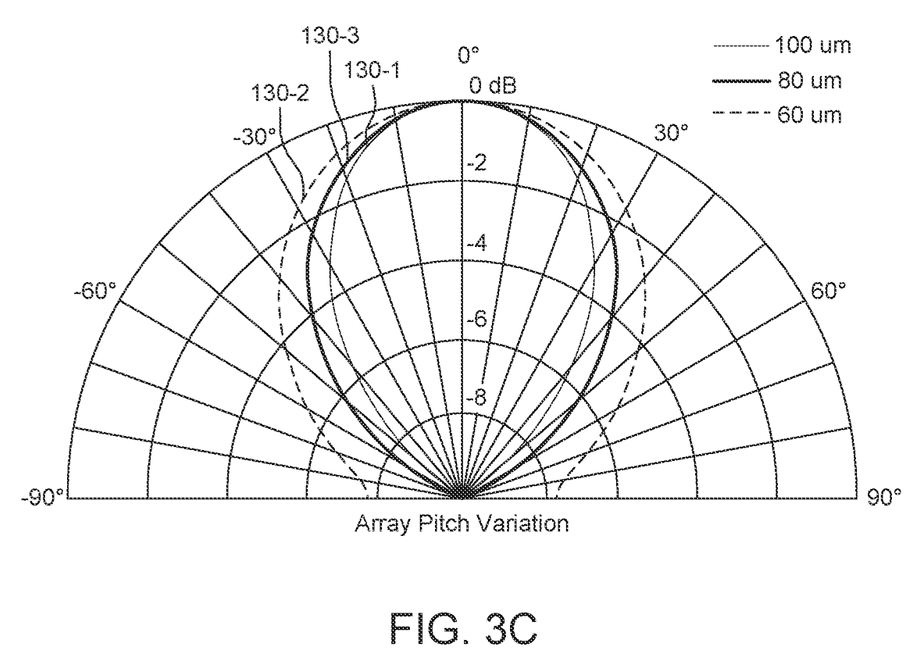
FIG. 3C illustrates three main directivity lobes of different beam widths according to a variation in the active element pitch according to the one or more embodiments.

This principle is illustrated in FIG. 3C, which shows three main directivity lobes of different beam widths according to a variation in the active element pitch. An active element pitch of 100 um between activated transmit transducers, for instance, produces the narrowest main directivity lobe 130-1, an active element pitch of 60 um produces the widest main directivity lobe 130-2, and an active element pitch of 80 um produces a main directivity lobe 130-3 having a beam width therebetween. The controller is configured to modulate the beam width of the main directivity lobe in this case by changing the active element pitch, either dynamically or semi- statically.

The controller is configured to semi-statically or continuously change the directivity characteristic of the main directivity lobe such that a sensitive spot located at the touch interface 114 changes to monitor for the edges of the contact patch. The sensitive spot is a cross-sectional area of incidence of the main directivity lobe 130 at the touch interface 114.

Moreover, the controller can simultaneously activate different groups of transmit transducers within the array 200 to simultaneously target different segments of the touch interface 114. Each group of transmit transducers produces a respective main directivity lobe directed at the touch interface such that a plurality of main directivity lobes are simultaneously formed. The groups can be configured in any conceivable size and can be mutually exclusive from each other.

This can be useful when monitoring for a touch event that may occur anywhere on the touch surface 104.

In summary, the controller may be configured to adjust a beam width of the main directivity lobe 130 by varying a number of activated transmit transducers within the array of transmit transducers 200. The controller can switch or toggle a beam width of the main directivity lobe between at least two different beam widths by selectively activating different numbers of transmit transducers. Additionally, or alternatively, the controller is configured to switch a beam width of the main directivity lobe 130 between at least two different beam widths by selectively changing an active element pitch between activated transmit transducers, where the beam width is inversely related to the pitch distance between the activated transmit transducers due to at least one of constructive interference and deconstruction interference of at least two ultra-sonic transmit waves that produce the main directivity lobe. The controller is configured to direct the main directivity lobe towards different regions of the touch interface 114 by selectively activating different groups of transmit transducers, where the different groups of transmit transducers are in different regions of the array of transmit transducers 200. Additionally, or alternatively, the array of transmit transducers 200 may include transmit transducers 105 having a plurality of sizes, and the controller is configured to adjust a beam width of the main directivity lobe by selectively activating the transmit transducers based on the plurality of sizes.

The receiver circuitry of the sensor circuit 107 measures the strength of the compound receive signal. The receiver circuitry is configured to measure the size of the contact patch 120 by continuously varying the directivity parameters of the main directivity lobe 130, comparing the compound received signal strength to both a touch-event threshold, to detect touch events, but also against the compound received signal strength of the previous beam setting. For example, if the beam width is enlarged compared to a previous measurement but the compound received signal strength does not change compared to the previous measurement, it means the edges of the contact patch 120 has been reached the current beam width. However, if the compound received signal strength increases when the beam width is enlarged, the edges of the contact patch 120 may not yet have been reached. Thus, another enlargement of the beam width is performed and the compound received signal strength is examined until there is no change between a compound received signal strength of a current measurement and that of a previous measurement. The receiver circuitry can thus infer the size of the contact patch 120 from the beam width that results in no further increase in the compound received signal strength. The compound received signal strength is a sum of all measurement signals from a same receive wave that exceed an amplitude threshold that is used for detecting a touch event or a presence of a contact patch 120.

The array of transmit transducers 200 is configured to transmit a first ultra-sonic transmit wave comprising a first main directivity lobe having a first directivity characteristic and transmit a second ultra-sonic transmit wave comprising a second main directivity lobe having a second directivity characteristic different from the first directivity characteristic. The first ultra- sonic transmit wave and the second ultra-sonic transmit wave may be consecutive in time (e.g., transmitted in adjacent excitation frames) or part of a sequence of measurements intended to discriminate a size of a detected contact patch 120. For example, a contact patch may be initially detected via a detected touch event and additional beams may be transmitted at the detected contact patch as a sequence of measurements intended to discriminate the size of the detected contact patch 120. Accordingly, by changing the beam width of the main directivity lobe 130, the array 200 may target a location at the touch interface 114 with different sized beams to discriminate the edges of a contact patch 120 and/or calculate a size of a contact patch 120.

To this end, the array of receive transducers 200 is configured to receive a first ultra-sonic reflected wave produced at least in part by internal reflection of the first main directivity lobe 130 at the touch interface 114 and convert the first ultra-sonic reflected wave into at least one first measurement signal. The array of receive transducers 200 is configured to receive a second ultra-sonic reflected wave produced at least in part by internal reflection of the second main directivity lobe 130 at the touch interface 114 and convert the second ultra-sonic reflected wave into at least one second measurement signal. The receiver circuit is configured to compare a first compound received signal strength of the at least one first measurement signal to a second compound received signal strength of the at least one second measurement signal to generate a comparison result, and detect the edges of the contact patch based on the comparison result, the first directivity characteristic, and the second directivity characteristic.

The receiver circuit is configured to compare each measurement signal to an amplitude threshold indicative of the touch event for detecting a touch event or compare the compound received signal strength to an amplitude threshold indicative of the touch event for detecting a touch event. Once a touch event is detected, the receiver circuit may look to determining a size of the detected contact patch by detecting the edges of the contact patch based on a compound received signal strength of the measurement signals (e.g., a summed signal strength of the measurement signals that exceed the amplitude threshold) and the directivity characteristic of the main directivity lobe, and determine the size of the contact patch based on the detected edges. For example, the measurement signals that exceed the amplitude threshold are summed up to calculate a compound received signal strength of the measurement signals.

Figure 4:
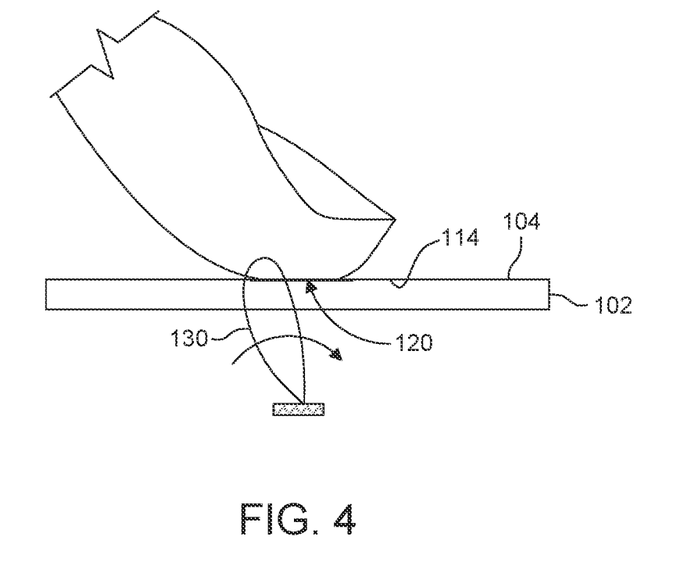
FIG. 4 illustrates an example of controlling a transmission direction or orientation angle of a main directivity lobe according to the one or more embodiments.

In addition to controlling the acoustic aperture or beam width of the main directivity lobe discussed above, embodiments may also use beam forming and beam steering to change the directivity characteristic of the main directivity lobe for determining the size of a contact patch 120. FIG. 4 illustrates an example of controlling a transmission direction or orientation angle of the main directivity lobe 130. This feature may be used to perform a scanning operation for detecting a presence of a contact patch (i.e., for detecting a touch event) and determining the size of the contact patch. The controller can configure the array of transceiver transducers 200 as a phased transmitter array by simultaneously activating a plurality of transmit transducers 105 in the array 200 to form a phased transmitter array. This feature may be used separately or in combination with acoustic aperture control.

The controller can control the excitation signals for selected transmit transducers 105 to have a predetermined phase relationship with respect to each other form the main directivity lobe in a desired transmission direction. For example, the controller may be configured to generate respective excitation signals for a plurality of transmit transducers. The respective excitation signals have a differential phase relationship $\Delta\phi$ with respect to each other. For example, each transmit transducers 105 may be coupled to a phase shifter ($\phi$) controlled by the controller. Each phase shifter may receive an excitation signal, apply a configured phase shift to the excitation signal, and provide a phase-shifted excitation signal to its respective transmit transducer for exciting the transmit transducer. Each applied phase shift may be a multiple of a preconfigured phase difference (e.g., 0, $\Delta\phi$, 2$\Delta\phi$, 3$\Delta\phi$, etc.) such that adjacent transmit transducers 105 are shifted in phase with respect to each other by the preconfigured phase difference $\Delta\phi$.

The orientation angle of the maximum emission (i.e., of the main directivity lobe) shifts with increasing phase difference $\Delta\phi$. Emission peak height of the main directivity lobe 130 also decreases with increasing phase difference. Thus, the size of the sensitive spot at the touch interface 114 also changes with modulation of the phase difference since the beam width of the main directivity lobe 130 changes as its emission peak height changes. Accordingly, the controller is configured to adjust a transmission angle of the main directivity lobe 130 by adjusting the differential phase relationship between the respective excitation signals. Additionally, the controller is configured to adjust a beam width of the main directivity lobe 130 incident at the touch interface 114 by adjusting the differential phase relationship between the respective excitation signals. The controller may dynamically adjust the differential phase relationship between the respective excitation signals to dynamically adjust the beam width of the main directivity lobe 130 incident at the touch interface 114 such that the main directivity lobe 130 is incident with different sized areas of the touch interface 114.

In one configuration, the controller is configured to dynamically adjust the differential phase relationship between the respective excitation signals to rotate the transmission angle of the main directivity lobe 130 such that the main directivity lobe 130 scans the touch interface 114. The controller may use the phase shifters connected to each transmit transducer 105 to dynamically and continuously adjust the differential phase relationship between the respective excitation signals to continuously rotate the transmission angle of the main directivity lobe 130.

Alternatively, the transmission angle of the main directivity lobe 130 may be changed by adjusting the frequency of the respective excitation signals while maintaining their phases at a constant phase shift $\Delta\phi$ relative to each other. In this case, the beam with of the main directivity lobe 130 changes simultaneously with a change in the transmission angle of the main directivity lobe 130. The frequencies of the respective excitation signals remain equal during the frequency shift. The transmission angle of the main directivity lobe 130 shifts with a change in the frequency due to the constant phase shift $\Delta\phi$. Thus, the controller can dynamically adjust the frequency of the respective excitation signals to rotate the transmission angle of the main directivity lobe 130 such that the main directivity lobe scans the touch interface 114. The controller is configured to maintain the phases of the respective excitation signals to have a constant phase shift relative to each other while dynamically adjusting the frequency of the respective excitation signals to rotate the transmission angle of the main directivity lobe 130.

The controller may employ a beam sweep to scan a region of the touch interface 114 for a touch event (i.e., for a contact patch). The receiver circuit is configured to compare, for example, the compound received signal strength to an amplitude threshold corresponding to a touch event and detect a touch event if the compound received signal strength exceeds the amplitude threshold. Once a touch event is detected, the edges of the contact patch 120 can be detected by changing the directivity parameters of the main directivity lobe 130 and comparing the compound received signal strength taken across multiple measurements.

Figure 5:
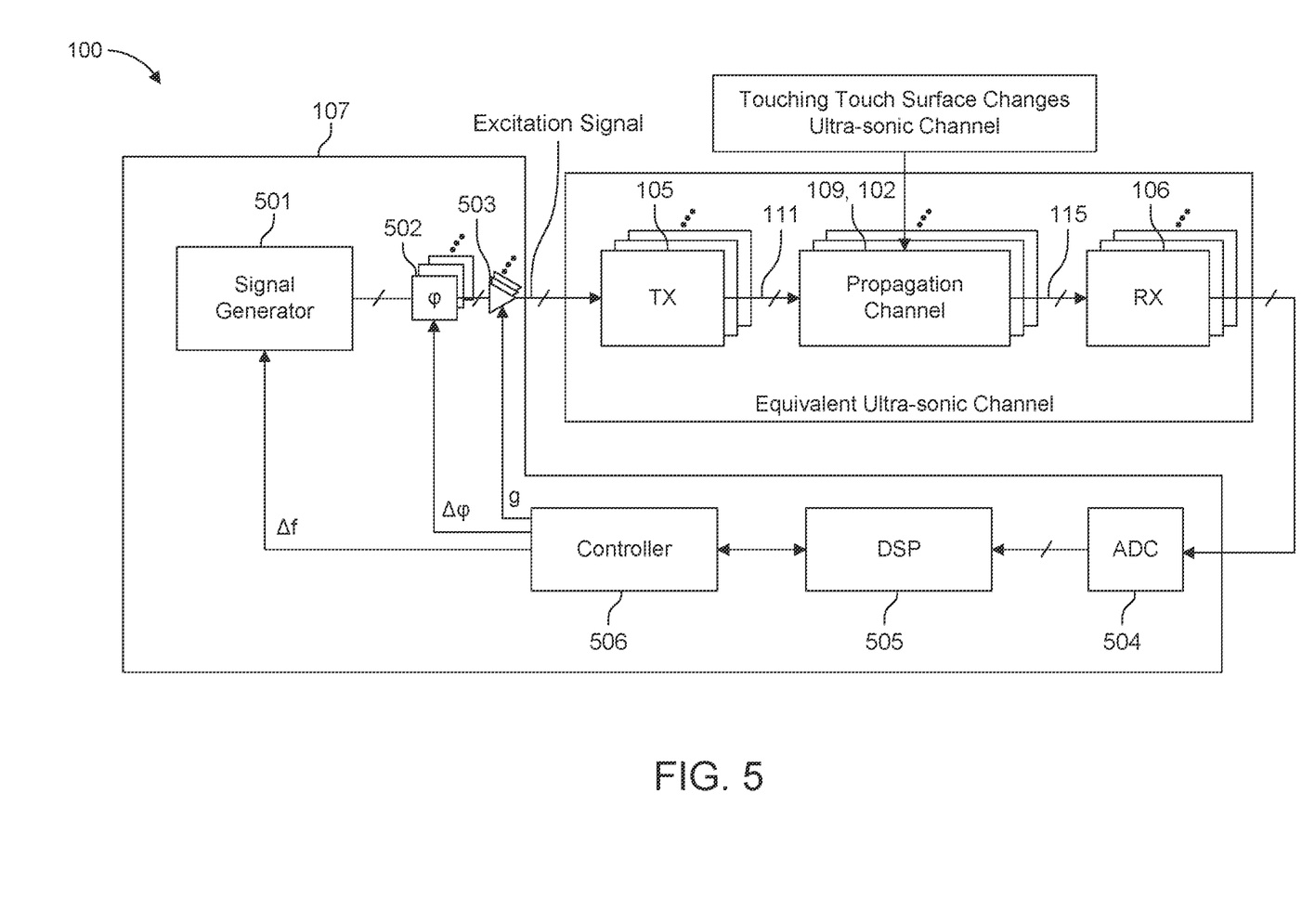
FIG. 5 illustrates a schematic block diagram of an ultra-sonic touch sensor according to one or more embodiments.

FIG. 5 illustrates a schematic block diagram of the ultra-sonic touch sensor 100 according to one or more embodiments. The ultra-sonic touch sensor 100 includes the sensor circuit 107 comprising both analog and digital domains, an array of transmit transducers, propagation channels comprising both the coupling medium 109 and the touch structure 102, including the interfaces 110 and 114, and an array of receive transducers. As noted above, the array of transmit transducers and the array of receive transducers may be separate arrays or combined in an array of transceiver transducers 200. Together, one or more transmit transducers 105, a propagation channel, and one or more receive transducers 106 make up the equivalent ultra-sonic channel of an ultra-sonic signal.

A touching of the touch surface 104 (i.e., a touch event) changes a property of the ultra-sonic channel and, more particularly, a property of the propagation channel.

The sensor circuit 107 includes a signal generator 501 that generates an excitation signal and transmits the excitation signal to one or more optional phase shifters 502 that are configured to apply a phase shift according to a phase shift setting set by controller 506. It is noted that acoustic aperture control may be performed with or without the phase shifters 502. The phase shifts of the phase shifters 502 may be set to be equal or be set with differential phase relationship (e.g., a preconfigured phase difference $\Delta\phi$) therebetween depending on the desired directivity characteristic of the main directivity lobe 130.

The sensor circuit 107 may optionally include power amplifiers 503 having adjustable gain settings g controlled by the controller 506. Each power amplifier 503 may be coupled to a different transmit transducer 105 and may be used to selectively activate its corresponding transmit transducer 105 for transmission. For example, a gain setting of zero assures that the power of any excitation signal provided to a transmit transducer 105 is zero. This effectively deactivates that transmit transducer 105 so that it does not transmit an ultra-sonic transmit wave. The controller 506 can control the gains of each power amplifier 503 to selectively activate or deactivate the transmit transducers 105 in the array. Alternatively, the power amplifiers 503 could be replaced with a multiplexer that selectively couples and decouples excitation signals to corresponding transmit transducers 105.

A transmit transducer 105 in turn generates an ultra-sonic transmit signal for transmission along the propagation channel based on an excitation signal. One or more receive transducers 106 receives the ultra-sonic transmit signal 111 as a reflected ultra-sonic signal 115. The receive transducers 106 transmit the received signals to the processing circuitry of the sensor circuit 107 as measurement signals for analysis.

The processing circuitry of the sensor circuit 107 includes a multi-bit ADC 504 that converts the analog signal into a multi-bit digital code or digital value and transmits the digital signal to a processing circuit 505 (e.g., a DSP). The processing circuit 505 evaluates the digital signals for detecting touch events (contact patches) by comparing the digital signals from each receive transducer 106 to an amplitude threshold corresponding to a touch event. The processing circuit 505 detects a touch event if one of the digital signals exceeds the amplitude threshold. Alternatively, the processing circuit 505 may compare a compound received signal strength of the digital signal to an amplitude threshold corresponding to a touch event and detect a touch event if the compound received signal strength exceeds the amplitude threshold.

If a touch event is detected, the processing circuit 505 may send a detection signal to the controller 506 to notify the controller 506 that a contact patch has been detected. The detection signal may include additional information, such as an approximate location of the contact patch. In response to receiving the detection signal, the controller 506 may change the directional characteristic of the main directivity lobe 130 for determining the size of the contact patch. The controller 506 may change the directional characteristic of the main directivity lobe 130 two or more times or perform a beam sweep to locate the edges of the contact patch.

The controller 506 may focus the main directivity lobe 130 in a neighboring area of the approximate location of the contact patch indicated in the detection signal. The controller 506 may control a frequency of the excitation signal by controlling a frequency shift $\Delta f$ of the signal generator, control a phase shift $\Delta\phi$ of the phase shifters, and/or control an activation and deactivation of the individual transmit transducers 105 by controlling the gain settings of the power amplifiers 503 in order to control the directional characteristic of the main directivity lobe 130. The controller 506 may also decrease or increase the transmitted power directed at particular region of the touch interface 114 by controlling the gain settings of the power amplifiers 503 of selected transmit transducers 105.

The processing circuit 505 is configured to sum the signal amplitudes of all digital signals to generate a compound received signal strength. The processing circuit 505 is further configured to detect the edges of the contract patch 120 by comparing the compound received signal strength taken across multiple measurements that are acquired with different directivity characteristics of the main directivity lobe 130. The processing circuit 505 is configured to compare a first compound received signal strength of the at least one first measurement signal to a second compound received signal strength of the at least one second measurement signal to generate a comparison result, and detect the edges of the contact patch based on the comparison result, the first directivity characteristic, and the second directivity characteristic. Thus, controller 506 and the processing circuit 505 are configured to measure the size of the contact patch 120 by varying the directivity parameters of the main directivity lobe 130 and comparing the compound received signal strength against the compounds received signal strength of one or more previous beam settings to determine the size of the contact patch 120. Once the processing circuit 505 determines the size of the contact patch 120, the processing circuit 505 determines an amount of contact force applied during the touch event based on the size of the contact patch by using a correlation algorithm.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Furthermore, the description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid in the understanding of the principles of the disclosure and the concepts contributed to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof. Thus, it is understood that modifications and variations of the arrangements and the details described herein will be apparent to others skilled in the art.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

What is claimed is:

1. A touch sensor, comprising:
a housing having an ultrasound port;
a touch structure coupled to the housing and arranged over the ultrasound port such that the ultrasound port forms an enclosed interior volume, wherein the touch structure comprises a touch interface and an inner interface arranged opposite to the touch interface, wherein the inner interface faces towards the enclosed interior volume;
an array of transmit transducers arranged inside the enclosed interior volume, wherein each transmit transducer is configured to transmit a respective ultra-sonic transmit wave in response to being activated by a respective excitation signal, wherein a main directivity lobe directed at the touch interface is produced by at least one ultra-sonic transmit wave;
an array of receive transducers arranged inside the enclosed interior volume and acoustically coupled to the array of transmit transducers, wherein the array of receive transducers receive an ultra-sonic reflected wave produced at least in part by internal reflection of the main directivity lobe at the touch interface and convert the ultra-sonic reflected wave into at least one measurement signal;
a controller configured to modulate an activation of the transmit transducers to control a directivity characteristic of the main directivity lobe by selectively generating at least one respective excitation signal; and
a receiver circuit configured to receive the at least one measurement signal, detect edges of a contact patch of a touch event present at the touch interface based on the at least one measurement signal, determine a size of the contact patch based on the detected edges, and determine an amount of contact force applied during the touch event based on the size of the contact patch.

2. The touch sensor of claim 1, wherein the receiver circuit is configured to determine whether a no-touch event or the touch event has occurred at the touch interface based on the at least one measurement signal.

3. The touch sensor of claim 2, wherein a property of a propagation path changes in response to the touch event, which changes a property of the ultra-sonic reflected wave.

4. The touch sensor of claim 1, wherein the controller is configured to adjust an orientation angle of the main directivity lobe by activating at least two transmit transducers.

5. The touch sensor of claim 1, wherein the controller is configured to adjust an orientation angle of the main directivity lobe by varying a number of activated transmit transducers within the array of transmit transducers.

6. The touch sensor of claim 1, wherein the controller is configured to adjust a beam width of the main directivity lobe by varying a number of activated transmit transducers within the array of transmit transducers.

7. The touch sensor of claim 1, wherein the controller is configured to switch a beam width of the main directivity lobe between at least two different beam widths by selectively activating different numbers of transmit transducers.

8. The touch sensor of claim 1, wherein the controller is configured to switch a beam width of the main directivity lobe between at least two different beam widths by selectively changing an active element pitch between activated transmit transducers.

9. The touch sensor of claim 8, wherein the beam width is inversely related to the active element pitch between the activated transmit transducers due to at least one of constructive interference and deconstruction interference of at least two ultra-sonic transmit waves that produce the main directivity lobe.

10. The touch sensor of claim 1, wherein the controller is configured to direct the main directivity lobe towards different regions of the touch interface by selectively activating different groups of transmit transducers, wherein the different groups of transmit transducers are in different regions of the array of transmit transducers.

11. The touch sensor of claim 1, wherein the array of transmit transducers comprises transmit transducers having a plurality of sizes, and the controller is configured to adjust a beam width of the main directivity lobe by selectively activating the transmit transducers based on the plurality of sizes.

12. The touch sensor of claim 1, wherein the controller is configured to simultaneously activate a plurality of transmit transducers in the array of transmit transducers to form a phased transmitter array.

13. The touch sensor of claim 12, wherein the controller is configured to generate respective excitation signals for the plurality of transmit transducers, wherein the respective excitation signals have a differential phase relationship, wherein the controller is configured to adjust a transmission angle of the main directivity lobe by adjusting the differential phase relationship between the respective excitation signals.

14. The touch sensor of claim 13, wherein the controller is configured to dynamically adjust the differential phase relationship between the respective excitation signals to rotate the transmission angle of the main directivity lobe such that the main directivity lobe scans the touch interface.

15. The touch sensor of claim 14, wherein the controller is configured to dynamically and continuously adjust the differential phase relationship between the respective excitation signals to continuously rotate the transmission angle of the main directivity lobe.

16. The touch sensor of claim 12, wherein the controller is configured to generate respective excitation signals for the plurality of transmit transducers, wherein the controller is configured to adjust a transmission angle of the main directivity lobe by adjusting a frequency of the respective excitation signals.

17. The touch sensor of claim 16, wherein the controller is configured to dynamically adjust the frequency of the respective excitation signals to rotate the transmission angle of the main directivity lobe such that the main directivity lobe scans the touch interface.

18. The touch sensor of claim 17, wherein the controller is configured to maintain phases of the respective excitation signals to have a constant phase shift relative to each other while dynamically adjusting the frequency of the respective excitation signals to rotate the transmission angle of the main directivity lobe.

19. The touch sensor of claim 18, wherein a beam width of the main directivity lobe changes simultaneously with a change in the transmission angle of the main directivity lobe.

20. The touch sensor of claim 12, wherein the controller is configured to generate respective excitation signals for the plurality of transmit transducers, wherein the respective excitation signals have a differential phase relationship, wherein the controller is configured to adjust a beam width of the main directivity lobe incident at the touch interface by adjusting the differential phase relationship between the respective excitation signals.

21. The touch sensor of claim 20, wherein the controller is configured to dynamically adjust the differential phase relationship between the respective excitation signals to dynamically adjust the beam width of the main directivity lobe incident at the touch interface such that the main directivity lobe is incident with different sized areas of the touch interface.

22. The touch sensor of claim 1, wherein the controller is configured to simultaneously activate different groups of transmit transducers, wherein each group of transmit transducers produces a respective main directivity lobe directed at the touch interface such that a plurality of main directivity lobes are simultaneously formed.

23. The touch sensor of claim 1, wherein:
the controller is configured to semi-statically or dynamically change the directivity characteristic of the main directivity lobe such that a sensitive spot located at the touch interface changes to monitor for the edges of the contact patch, wherein the sensitive spot is a cross-sectional area of incidence of the main directivity lobe at the touch interface.

24. The touch sensor of claim 1, wherein:
the array of transmit transducers is configured to transmit a first ultra-sonic transmit wave comprising a first main directivity lobe having a first directivity characteristic and transmit a second ultra-sonic transmit wave comprising a second main directivity lobe having a second directivity characteristic different from the first directivity characteristic,
the array of receive transducers is configured to receive a first ultra-sonic reflected wave produced at least in part by internal reflection of the first main directivity lobe at the touch interface and convert the first ultra-sonic reflected wave into at least one first measurement signal,
the array of receive transducers is configured to receive a second ultra-sonic reflected wave produced at least in part by internal reflection of the second main directivity lobe at the touch interface and convert the second ultra-sonic reflected wave into at least one second measurement signal, and
the receiver circuit is configured to compare a first compound received signal strength of the at least one first measurement signal to a second compound received signal strength of the at least one second measurement signal to generate a comparison result, and detect the edges of the contact patch based on the comparison result, the first directivity characteristic, and the second directivity characteristic.

25. The touch sensor of claim 1, wherein the receiver circuit is configured to compare each of the at least one measurement signal to an amplitude threshold indicative of the touch event, detect the edges of the contact patch based on a compound received signal strength of the at least one measurement signal and the directivity characteristic of the main directivity lobe, and determine the size of the contact patch based on the detected edges.

26. The touch sensor of claim 1, wherein the amount of contact force is proportional to the size of the contact patch.

27. The touch sensor of claim 26, wherein the size of the contact patch is an area of impedance change at the touch interface resultant from the touch event.

28. A touch sensor, comprising:
a housing having an ultrasound port;
a touch structure coupled to the housing and arranged over the ultrasound port such that the ultrasound port forms an enclosed interior volume, wherein the touch structure comprises a touch interface and an inner interface arranged opposite to the touch interface, wherein the inner interface faces towards the enclosed interior volume;
an array of transceiver transducers arranged inside the enclosed interior volume, wherein each transceiver transducer is configured transmit a respective ultra-sonic transmit wave in response to being activated by a respective excitation signal, wherein a main directivity lobe directed at the touch interface is produced by at least one ultra-sonic transmit wave,
wherein the array of transceiver transducers is configured to receive an ultra-sonic reflected wave produced at least in part by internal reflection of the main directivity lobe at the touch interface and convert the ultra-sonic reflected wave into at least one measurement signal;
a controller configured to modulate an activation of the transceiver transducers to control a directivity characteristic of the main directivity lobe by selectively generating at least one respective excitation signal; and
a receiver circuit configured to receive the at least one measurement signal, detect edges of a contact patch of a touch event present at the touch interface based on the at least one measurement signal, determine a size of the contact patch based on the detected edges, and determine an amount of contact force applied during the touch event based on the size of the contact patch.

29. A touch sensor, comprising:
a housing having an ultrasound port;
a touch structure coupled to the housing and arranged over the ultrasound port such that the ultrasound port forms an enclosed interior volume, wherein the touch structure comprises a touch interface and an inner interface arranged opposite to the touch interface, wherein the inner interface faces towards the enclosed interior volume;

an array of transmit transducers arranged inside the enclosed interior volume, wherein each transmit transducer is configured to transmit a respective ultra-sonic transmit wave in response to being activated by a respective excitation signal, wherein a main directivity lobe directed at the touch interface is produced by at least one ultra-sonic transmit wave;

an array of receive transducers arranged inside the enclosed interior volume and acoustically coupled to the array of transmit transducers, wherein the array of receive transducers receive an ultra-sonic reflected wave produced at least in part by internal reflection of the main directivity lobe at the touch interface and convert the ultra-sonic reflected wave into at least one measurement signal;

a controller configured to modulate an activation of the transmit transducers to control a directivity characteristic of the main directivity lobe by selectively generating at least one respective excitation signal; and a receiver circuit configured to receive the at least one measurement signal, determine a size of a contact patch of a touch event present at the touch interface based on the at least one measurement signal and the directivity characteristic of the main directivity lobe, and determine an amount of contact force applied during the touch event based on the size of the contact patch.

30. A touch sensor, comprising:

a housing having an ultrasound port;

a touch structure coupled to the housing and arranged over the ultrasound port such that the ultrasound port forms an enclosed interior volume, wherein the touch structure comprises a touch interface and an inner interface arranged opposite to the touch interface, wherein the inner interface faces towards the enclosed interior volume;

an array of transceiver transducers arranged inside the enclosed interior volume, wherein each transceiver transducer is configured transmit a respective ultra-sonic transmit wave in response to being activated by a respective excitation signal, wherein a main directivity lobe directed at the touch interface is produced by at least one ultra-sonic transmit wave, wherein the array of transceiver transducers is configured to receive an ultra-sonic reflected wave produced at least in part by internal reflection of the main directivity lobe at the touch interface and convert the ultra-sonic reflected wave into at least one measurement signal;

a controller configured to modulate an activation of the transceiver transducers to control a directivity characteristic of the main directivity lobe by selectively generating at least one respective excitation signal; and a receiver circuit configured to receive the at least one measurement signal, determine a size of a contact patch of a touch event present at the touch interface based on the at least one measurement signal and the directivity characteristic of the main directivity lobe, and determine an amount of contact force applied during the touch event based on the size of the contact patch.

\* \* \* \* \*